United States Patent Office 3,159,268
Patented Dec. 1, 1964

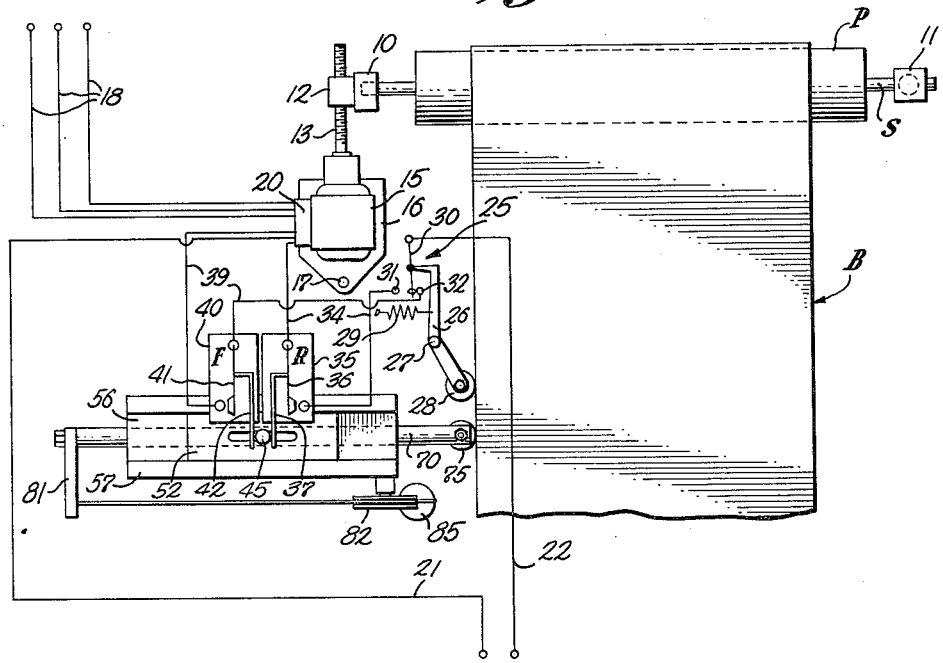

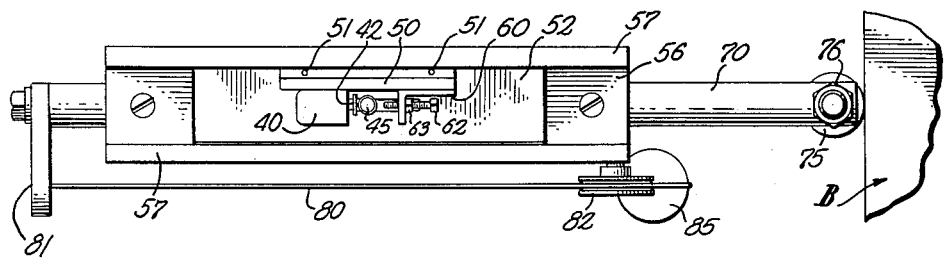
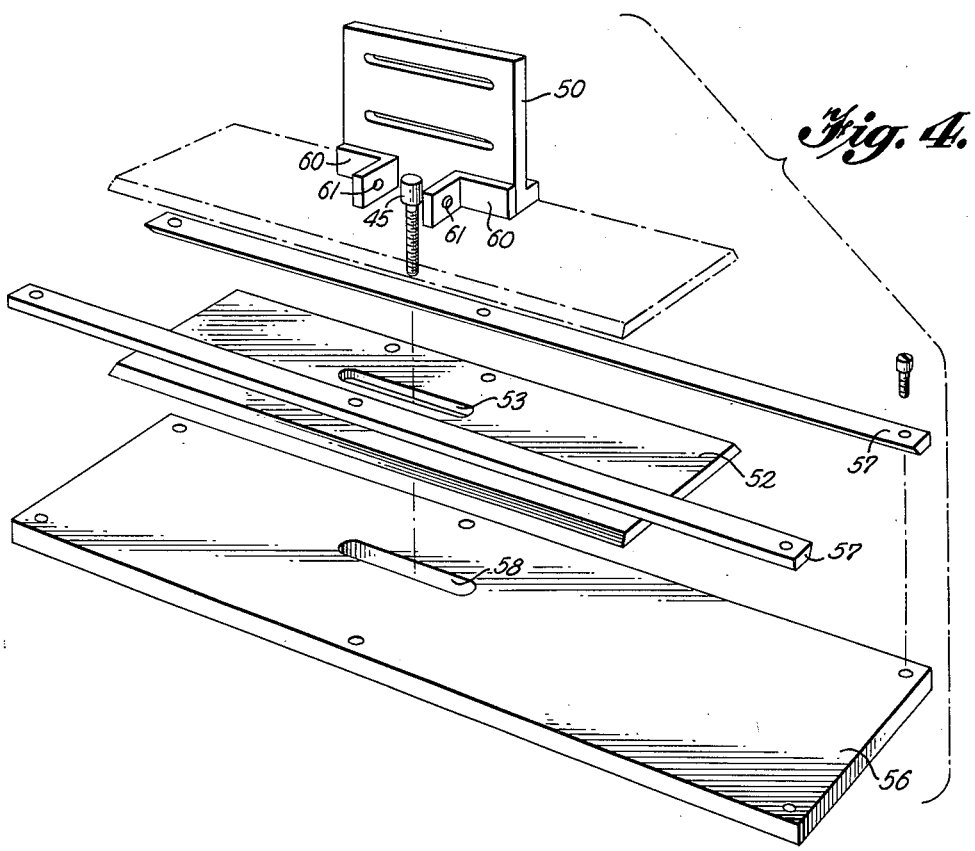

3,159,268
TRAINING CONTROL FOR CONVEYOR BELTS
Robert G. Dyke, Taunton, Mass., assignor, by mesne assignments, to Rohm & Haas Company, Philadelphia, Pa., a corporation of Delaware
Filed Nov. 2, 1961, Ser. No. 149,674
6 Claims. (Cl. 198—202)

Generally, the invention herein relates to the art of belt conveyors. Specifically, it is drawn to controlling the training of a belt over the bend pulley in a conveyor installation to thereby maintain the belt passing across the central portion of such pulley when the conveyor is in operation.

The maintenance of a belt made of flexible resilient belting material in proper alignment or trained relation with the bend pulleys in a conveyor installation may be achieved rather easily as for example by crowning the bend pulley so that they are of smaller diameter at their outer ends than at the center. However, where the conveyor belt must pass through high heat areas as in conveying articles or material through an oven, the use of the well known flexible resilient belting materials is not feasible. In such installations, a steel band belt which can withstand the high temperature conditions is frequently used. This belting is generally of relatively thin carbon or stainless steel strip which is alloyed and heat treated to withstand the continuous flexing occurring in passing over the bend pulleys at the head and foot terminals of the installation. An example of an installation of where steel band belting is employed occurs in the production of extruded latex thread where such belting conveys the threads through long high temperature curing ovens used in the equipment for producing such thread.

The instant invention finds particular application in belt conveyor installations that employ a steel band belt which is trained across the pulleys disposed at the head and foot terminals of the installation. These bend pulleys are essentially cylindrical throughout their length although a slight taper near the outer ends of each bend pulley may exist. In such installations, there is a particular need for providing control means which will insure that the belt remains properly trained across the bend pulleys while the conveyor installation is in operation.

The lack of resiliency and the effect of temperature changes to which the steel band belt may be exposed to in use contribute to the problem of maintaining the steel band belt properly trained over the bend pulleys. By its nature, the steel band belt must be maintained to provide a flat conveying surface and thus substantially cylindrical bend pulleys are required at the head and foot terminals of the conveyor installation. As the steel belt passes through a heating zone, localized heating and cooling of portions of the belt may occur which will in turn cause localized expansion and contraction longitudinally of the belt thereby setting up stresses on the conveyor installation which can have the effect of starting the belt to shift or walk laterally along the bend pulley.

Further it is quite difficult to form a perfect steel band belt and any imperfections in its forming can create problems in maintaining the belt properly trained over the bend pulleys. The difficulty in forming the belt may be described in relation to production of the relatively thin carbon or stainless steel strip. Despite careful control in the steel rolling operation, there invariably results a certain degree of camber along the length of the steel strip which is to be joined at its ends in forming the belt. This camber will show up by a degree of convexity in the longitudinal edge of the steel strip as reflected by the fact that a straight edge or straight line extending along the edge between the end corners of the strip will not coincide along its length with the edge of the strip. In a belt of several hundred feet in length, this camber may amount to as much as two or three inches departure from a straight reference line.

A theoretically perfect steel band belt is also difficult to form in connection with joining the ends of the steel strip. If the ends to be joined are not perfectly squared, they will, when united, form a belt in which the portions of the steel strip on opposite sides of the joint will not extend in true longitudinal alignment with each other.

Belts that are not theoretically perfect tend to increase the difficulty of maintaining the belt properly trained over the bend pulleys of the conveyor installation. As the width of the belt increases, and belts of several feet in width are not uncommon, the lack of resiliency and reaction to temperature changes become greater problems in maintaining training of the belt across the bend pulleys. The difficulties in these areas may be more readily appreciated when it is realized that conveyor systems with these relatively wide steel band belts passing through elongated high temperature ovens, may be 300 feet in length involving a belt formed from a thin steel strip 600 feet in length.

Failure to maintain the belt trained over the bend pulleys is serious as pointed up by the substantial cost per square yard of the stainless strip belting which may be completely destroyed should the belt shift laterally on the bend pulleys and engage with the mounting of the pulleys or other stationary parts adjacent the lateral edges of the belt. With currently available belt training controls, it has been found necessary in the longer steel band conveyor systems to maintain a training control at each end of the system, and even with this degree of training control, the wider belts may shift on the belt pulleys damaging the belt involving loss of the costly belt and long and expensive down time of the equipment for repair of the system.

There have been various proposals in the prior art for providing the control deemed necessary to maintain proper training of steel belting over the bend pulleys in a conveyor installation. These proposals have applied a corrective action to maintain training of the belt by swinging of the axis of at least one of the bend pulleys about one end of such axis and in a plane generally parallel to the supporting surface of the conveyor belt. The swinging of the axis has been achieved by a reversible motor connected to shift the bearing block mounting one end of the shaft on which the pulley is supported.

Various approaches have been conceived to create and apply a control signal to start, reverse and stop the motor so that it will affect swinging of the bend pulley axis in the proper direction to correct after misalignment or mistraining of the belt across the pulley has been sensed. The prior proposals have incorporated a switch or other sensing means mounted adjacent the edge of the belt to cause the motor to swing the bend pulley axis in one direction when the belt edge is sensed to be on one side of a predetermined centering point and swing the bend pulley axis in the opposite direction when the belt edge is sensed to be on the other side of this centering point.

Such controls result in substantially constant operation of the reversible motor since it is driven in one direction or the other at all times. The motor operation and its constant reversing very often must occur under high ambient temperature conditions thereby contributing to rapid wear of all moving parts in the control mechanism.

More important, prior controls have relied on a single switch or sensing means operable between two actuated conditions whenever the edge of the belt moves across the predetermined centering point. By their nature, these controls may impart an excess corrective action in swinging the bend pulley axis. This follows from the fact that the bend pulley axis is swung continuously in one direction at all times that the belt edge is sensed to be on one side of the centering point and swung in the opposite direction at all times when the belt edge is sensed to be on the opposite side of the center point. This action contributes to hunting, an effect promoting continuous shifting of the belt, and almost any abnormal belt movement can throw this type of belt control out of balance causing the belt to shift laterally to such an extent that a limit switch on the installation will be closed and the entire conveyor installation shut down.

The instant invention has at is principal object the provision of an improved method and apparatus wherein the training position of the belt relative to the bend pulley is continuously sensed and the indication of this position employed together with an indication of the direction of shifting of the belt to maintain the belt on the central portion of the pulley irrespectively of conditions to which the belt is exposed tending to shift the belt laterally of such pulley.

Another important object of the instant invention resides in providing an improved conveyor belt control device and method of maintaining a conveyor belt trained over the bend pulley wherein corrective swinging of the bend pulley axis in response to sensing of a mistraining position for the belt relative to the bend pulley is terminated when it is determined that the belt is shifting back toward its properly trained position thereby precluding excessive correction for any mistraining of the belt.

A further object of the instant invention is to provide a conveyor belt control device for swinging the bend pulley axis to control training of the belt over the central portion of such pulley wherein the corrective action of swinging the bend pulley axis is only applied for approximately one half of the period of deviation of the belt from its central trained position until it returns to such central trained position thereby reducing the possibility of over correction and minimizing operational wear on the control apparatus.

The above and other objects and novel features of the instant invention will be readily apparent from the following description taken in connection with the accompanying drawings. It is to be expressly understood that the drawings are for the purpose of illustration and are not intended to define the limits of the invention but rather to merely illustrate a preferred embodiment and structure incorporating features of the instant invention suitable for carrying out the method of such invention.

In the accompanying drawings forming a part of this specification and wherein like reference numerals are employed to identify like parts:

FIGURE 1 is a plan view showing the control device of the instant invention associated with a bend pulley in a conveyor installation with parts illustrated schematically.

FIGURE 2 is a side elevation of the belt follower and switch means forming a part of the control device shown in FIGURE 1.

FIGURE 3 is a plan view of the structure shown in FIGURE 2 with one half of the switch means removed to illustrate the adjustable stop means associated with the slide carrying the switch means; and FIGURE 4 is an exploded view showing the assembly of the parts on the top of the belt follower of FIGURE 2.

By reference to FIGURE 1, the general relationship of the belt control device in a conveyor installation can best be appreciated. This figure illustrates a portion of a steel band belt B which passes over a bend pulley P disposed at one terminal end of a conveyor installation. The other end of belt B will pass over a similar bend pulley (not shown) at the other terminal of the conveyor installation. The belt control device is associated with one end of the conveyor installation as shown in FIGURE 1. In particularly long conveyor installations, a similar belt control device may be associated with the belt adjacent the other terminal of the conveyor to further insure accurate training of the belt across the bend pulleys of the installation.

With the steel band belt B, pulley P will have a substantially cylindrical surface around which the belt is trained with the upper run of the belt providing the conveying surface. Pulley P is mounted to rotate about an axis provided by shaft S with the shaft S being journaled in bearings 10 and 11 shown mounted adjacent the opposite ends of pulley P. The bearing 11 is suitably supported to permit limited swinging movement of the axis of shaft S and pulley P in a plane generally parallel to the conveying surface of the upper run of belt B, while bearing 10 is mounted to be movable to affect swinging of the bend pulley axis as called for in applying the belt training control.

The belt is driven by suitable drive means (not shown) connected to drive the shaft of the bend pulley. Although the extent of swing of the bend pulley axis is sufficient to shift the belt laterally on the bend pulley as it passes thereover, the extent of swing is not so great as to seriously interfere with the bearings or drive means provided to support and drive the bend pulley shaft. The supports for the bearings 10 and 11 and bend pulley P are not shown in detail since it will be recognized that various appropriate constructions to achieve these ends may be employed within the scope of the instant invention.

To affect swinging of the bend pulley in achieving the desired corrective action to maintain the belt properly trained, the bearing 10 is secured to a nut member 12 which is internally threaded and engaged by a screw 13. Screw 13 is driven by a motor 15, the motor being mounted on a swingable base plate 16 suitably supported on pin 17.

In the embodiment illustrated, the motor 15 is a three phase motor supplied from lines 18. The motor 15 is reversible and appropriate control switches for starting, stopping and reversing the rotational direction of motor 15 are provided in control box 20. Appropriate control power for operating the switches in box 20 to achieve the desired operating condition of motor 15 is supplied through lines 21 and 22. It will be noted that line 21 feeds direct to control box 20, while line 22 has the switch means associated in the training control described hereinbelow interposed therein.

A single pole, double throw switch 25 is connected in line 22 and actuated by a lever 26 pivotally supported at 27 and provided at one end with a roller 28 which engages with one edge of belt B. Switch 25 is mounted in fixed position adjacent the edge of belt B so as to be operated through lever 26 in accordance with the lateral shifting of belt B relative to bend pulley P. A spring 29 may be provided to maintain roller 28 in engagement with the edge of belt B.

Switch 25 is disposed so that in the central trained position of the belt on the bend pulley the contactor 30 of the switch will be disposed between contacts 31 and 32 of the switch. In this position, the edge of the belt may be described as coinciding with a centering point, the centering point being optimum position in which it is desired to maintain the belt for it to be properly trained over the bend pulley.

Referring to the relationships shown on FIGURE 1, when the belt B shifts to the left so that the edge engaged by roller 28 is to the left of the centering point contactor 30 of switch 25 connects line 22 to contact 32. Similarly, when the belt shifts so that the edge is to the right of the centering point, switch 25 is changed to its other actuated condition with contactor 30 connecting line 21 to contact 31.

The contacts 31 and 32 of switch 25 are connected through circuits described in detail hereinafter which terminate in control box 20 and by the appropriate control switches in such box cause motor 15 to operate in one direction or the other. It will be readily recognized that the control power through lines 21 and 22 can operate suitable magnetic motor control relays to achieve the desired motor operating condition, all as well known in the motor control arts.

Again, referring to FIGURE 1 with switch 25 in the actuated condition shown, the edge of belt B has been sensed to be disposed to the left of the centering point. Therefore, contact 32 will be connected to operate a control switch in box 20 such that motor 15 will rotate in what may be termed a forward direction thereby rotating screw 13 to move nut member 12 and bearing 10 attached thereto upwardly as viewed in FIGURE 1 to cause rightward lateral shifting of belt B on bend pulley P. If the belt edge is sensed to be to the right of the centering point, switch 25 will be closed through contact 31 as described above and set up operation of motor 15 in a reverse direction to swing the axis of pulley P downwardly about bearing 11 to thereby cause leftward lateral shifting of the belt.

The operating condition of motor 15 is not entirely under the control of the particular actuated condition of switch 25. Line 34 extends from contact 31 to switch 25 to control box 20 and has a switch 35 interposed therein while line 39 extending from contact 32 to control box 20 has a switch 40 interposed therein. The switch means provided by switches 35 and 40 as illustrated on the drawing are mounted and operated in a manner as will be described to determine or sense the direction of movement of the edge of the belt B at any particular instant. As will become apparent their operation and interconnection with switch 25 is such that the condition of operation of motor 15 is changed whenever the direction of lateral shift of the belt reverses.

For example, if motor 15 is rotating in a forward direction and the direction of lateral shifting of the belt reverses, the motor will be stopped. If the motor is operating in the reverse direction and the direction of shift of the belt reverses, the motor is stopped. Should the motor be stopped and the direction of shift of the belt reverse the motor is started, its direction of rotation depending on the actuated condition of switch 25. Also, the motor is started with its direction of rotation being determined by the particular actuated condition of switch 25 whenever the belt edge shifts past the centering point. Switch 35 includes a contactor 36 which is in a normally open circuit condition and is closed by force applied to actuator 37. Similarly, switch 40 has a normally open circuit contactor 41 which is closed by force applied to actuator 42. The actuators 37 and 42 are acted upon by a pin member 45 associated with the belt follower mechanism described below.

As shown more clearly in FIGURES 2, 3, and 4, the switches 35 and 40 are mounted on an upstanding plate 50 which is fastened by screws 51 to a slide 52. Slide 52 has a slot 53 through which pin member 45 extends.

A frame 55 suitably supported adjacent the edge of the belt B by support members (not shown) is provided with a top plate 56 having a guide-way for slide 52 formed by rails 57 secured along the longitudinal side edges of plate 56. The edges of slide 52 are suitably beveled to engage beneath correspondingly beveled edges of rails 57 so that slide 52 will be confined to sliding movement longitudinally of plate 56. The plate is also provided with an elongated slot 58 through which the pin member 45 extends.

The upstanding plate 50 carries angles 60 which are secured to the face on which switches 35 and 40 are mounted with one leg of each angle extending outwardly and these outwardly extending legs being disposed on opposite sides of the head of pin member 45. Each leg has a threaded aperture 61 which receives a bolt 62. The bolts 62 are threaded inwardly toward the head of pin member 45 with the ends thereof forming limit stops to restrict the extent of movement of pin member 45 in acting on actuators 37 and 42 of switches 35 and 42 respectively. The bolts 62 may be provided with suitable lock nuts 63 to enable securing the bolts in position once they have been properly adjusted.

The frame 55 also provides guides 65 which slidably support a follower rod 70. Intermediate the two guides 65, a collar 71 is secured on rod 70 as by a set screw 72 with pin member 45 being threaded into the collar and affixed thereto by a nut 73. A roller 75 is rotatably mounted on the outer end of follower rod 70 by bolt and nut fastner 76 with roller 75 engaging with the lateral bias the follower rod 70 and roller 75 into continuous engagement with the edge of belt B, a flexible cable 80 is connected to a cap bar 81 on the end of rod 70 and extends over a pulley 82 mounted on frame 55. An appropriate weight 85 secured to the other end of cable 80 applies a biasing force to continuously urge follower rod 70 to the right as shown in FIGURE 2 so that roller 75 will be maintained in engagement with the edge of belt B as such edge shifts laterally back and forth.

Before undertaking a description of a complete operation of the training control device as described above, it may be well to briefly mention the functioning of the follower mechanism and its action in operating the switch means provided by switches 35 and 40. In the position of the follower mechanism shown in FIGURES 1, 2 and 3, the pin member 45 mounted on follower rod 70 is shown centered between the actuators 37 and 42 of switches 35 and 40 respectively. This relationship presupposes a condition where the edge of belt B as the belt passes across bend pulley P is not shifting laterally in either direction.

Assuming that the edge commences to shift to the left as shown in FIGURES 1 and 2, such action will cause pin member 45 to move to the left closing switch 40 so that a leftward shifting of the belt edge is determined. Continued leftward movement of the belt edge will have no further effect on switch 40 since the head of pin member 45 will press actuator 42 of switch 40 against the stop end of the adjacent bolt 62 and slide 52 will move along the continued movement of rod 70. Thus, although the follower rod 70 and pin member 45 continue to move to the left, this motion will be accompanied only by sliding of slide 52 along plate 56 between guides 57.

When the above assumed leftward shifting of the belt edge ceases and the belt edge commences to shift to the right, immediately, switch 40 will be opened as pin member 45 starts to move to the right with switch 35 being closed and held closed by pin member 45 as the belt edge continues lateral shift in a rightward direction. It will thus be seen that switches 35 and 40 by their respective closing and opening under the control of the belt follower will determine or give an indication of the direction of movement of the belt edge and of the reversal of the direction of this lateral shifting movement.

The overall operation in maintaining control will be readily understood from the description of the structure and functioning of various components as set forth above. The operation may be described by reference to the circuitry shown in FIGURE 1.

With the belt edge disposed to the left of the desired centering point, switch 25 is in the actuated condition as shown on FIGURE 1 connecting line 22 to contact 32. Assuming that the belt edge has just passed the centering point and is continuing in a leftward lateral shifting direction, such indicates need for corrective action by shifting of the bend pulley axis in a direction to urge the belt to return toward a position where its edge and the centering point coincide. The leftward shifting of the belt edge moves pin member 45 through follower rod 70 and roller 75 to close switch 40, thereby line 39 from contact 32 is closed to start the motor 15 in a direction to apply the needed corrective swinging of the bend pulley axis.

When the leftwardly shifting of the belt ceases and the belt edge starts to shift to the right thus returning toward coincidence with the centering point, pin member 45 disengages from actuator 42 thereby opening switch 40 and stopping motor 15 since line 39 is now open. The rightward movement of pin member 45 as it follows the lateral shifting of the belt edge closes switch 35. However, motor 15 is not started in the opposite direction by this closing of switch 35 since line 22 is open at switch 25.

This open condition and thus stopped condition of motor 15 continues during rightward shifting of the belt edge until the edge coincides with the centering point whereupon switch 25 is operated to its other actuated condition with contactor 30 then closing through contact 31. Since switch 35 is closed because of the rightward direction of shifting of the belt edge, the closing through contactor 30 and contact 31 completes line 34 and motor 15 then commences operation in the opposite direction to swing the bend pulley axis in a direction tending to overcome the continued rightward shifting of the belt.

From the above description, it will be appreciated that when the rightward shifting movement of the belt reverses, this reversal in shifting direction will be accompanied by again stopping the motor 15 and maintaining it in this condition of operation until the lateral shifting direction again reverses or the switch 25 senses that the belt edge has again moved past coincidence with the centering point.

It may be pointed out that should the lateral shifting of the belt, while such shifting is returning the belt edge toward coincidence with the centering point, reverse its direction without passing the centering point, such reverse of direction will have the effect of again starting the motor 15 and applying a further corrective swinging movement to the bend pulley axis.

It will thus be appreciated that in the method and apparatus for achieving proper belt training of this invention, the corrective action of swinging the bend pulley axis is applied only while the belt edge is moving away from the centering point, the centering point being the desired position for proper training of the belt across the bend pulley. When the belt edge starts to move toward the centering point, no corrective action is applied.

Whereas the switch means operable to determine the direction of lateral shifting of the belt B has been illustrated in the form of separate single pole, single throw switches 35 and 40, it will be appreciated that a single switch could be substituted for switches 35 and 40 with the operation of such substitute switch being appropriately controlled by movements of pin 45. Also it will be recognized that various drive means for swinging the bend pulley axis may be substituted for the reversible electric motor driving a screw and nut form of actuator illustrated. Thus, other forms of motors and actuators may be employed, all within the scope of this invention as contemplated in the appended claims.

Many other variations and modifications of the present invention will occur to those skilled in the art from a study of the invention embodiment specifically disclosed herein. All such variations and modifications which come within the spirit and scope of the appended claims are intended to be included herein as fully and completely as if they had been specifically illustrated, described and claimed. Thus, the modification specifically disclosed is exemplary only and not intended to be limiting on the scope of the invention.

I claim:
1. A device for maintaining a belt trained over the central portion of the bend pulley in a belt conveyor installation having means at one end of the bend pulley shaft for swinging the shaft axis of the pulley in a plane generally parallel to the supporting surface of the belt, said device comprising reversible drive means coupled to swing the bend pulley axis and thereby promote lateral shifting of said belt on said bend pulley, first sensing means operable between two actuated conditions by lateral shifting of the belt on the bend pulley, second sensing means operable between two actuated conditions when the direction of lateral shifting of the belt reverses, said first sensing means being connected to operate said drive means in one direction when in one actuated condition and operate said drive means in the opposite direction when in the other actuated condition, and second sensing means being interconnected with said first sensing means to change the condition of operation of said drive means upon each reversal in direction of lateral shifting of the belt as sensed by said second sensing means, said condition change being between a condition of operation in the direction determined by the particular actuated condition of said first sensing means and a stopped condition.

2. A device for maintaining a belt trained over the central portion of the bend pulley in a belt conveyor installation having means at one end of the bend pulley shaft for swinging the shaft axis of the pulley in a plane generally parallel to the supporting surface of the belt, said device comprising a reversible electric motor connected to swing the bend pulley axis and thereby promote lateral shifting of the belt on the bend pulley, first switch means operable between two actuated conditions by lateral shifting of the belt on the bend pulley and connected to operate said motor in one rotational direction when in one actuated condition and operate said motor in the opposite rotational direction when in the other actuated condition, second switch means operable between two actuated conditions, follower means to engage with the belt to follow lateral shifting movements of the belt, means connecting said follower means and said second switch means to operate said second switch means between its two actuated conditions when the direction of lateral shifting of the belt reverses, said second switch means being interconnected with said first switch means to change operation of said motor between operation in the rotational direction determined by the particular actuated condition of said first switch means and a stopped condition upon each reversal in direction of lateral shifting of the belt as sensed by said follower means.

3. A device as recited in claim 2 wherein said means connecting said follower means and said second switch means comprises a slide supporting said second switch means to be movable in a path parallel to the path of movement of said follower means and an operator member carried by said follower means and engageable with said second switch means to operate said second switch means to one actuated condition moving said slide along with movement of said follower means in one direction and to operate said second switch means to its other actuated condition moving said slide along with movement of said follower means in the opposite direction.

4. A device for maintaining a belt trained over the central portion of the bend pulley in a belt conveyor installation having means at one end of the bend pulley shaft for swinging the shaft axis of the pulley in a plane generally parallel to the supporting surface of the belt, said device comprising a reversible electric motor connected to swing the bend pulley axis and thereby promote lateral shifting of the belt on the bend pulley, first switch means mounted to be operated between two actuated conditions by lateral shifting of the belt on the bend pulley, said first switch means being connected to operate said motor in one rotational direction when in one actuated condition and operate said motor in the opposite rotational direction when in the other actuated condition, a support slidably mounting a follower to be movable in a path generally normal to the path of movement of the belt, means biasing said follower toward continuous engagement with the edge of the belt, a slide mounted on said support to be slidable in a path generally parallel to the path of movement of said follower, second switch means carried by said slide and operated by an operator member movable with said follower, said second switch means including a first circuit closing contactor in series relation with said one actuated condition of said first switch means and a second circuit closing contactor in series relation with said other actuated condition of said first switch means, said first contactor being operated to circuit closing relation and said second contactor being operated to circuit opening relation upon said follower commencing movement in one direction, and said first and second contactors being operated to circuit opening relation and circuit closing relation respectively upon said follower commencing movement in the opposite direction.

5. A device as recited in claim 4 wherein said biasing means includes a weight and cable connected to said follower to apply a uniform biasing force urging said follower into engagement with the edge of the belt.

6. A device as recited in claim 4 wherein adjustable stop means are provided on said slide to predetermine the extent of permissible movement of said operator member relative to said slide in effecting operation of said switch means.

References Cited in the file of this patent

UNITED STATES PATENTS

| | | |
|---|---|---|
| 2,346,765 | Kratz | Apr. 18, 1944 |
| 2,347,893 | Dickhaut | May 2, 1944 |